US010866099B1

(12) United States Patent
Mazilu et al.

(10) Patent No.: US 10,866,099 B1
(45) Date of Patent: Dec. 15, 2020

(54) ELECTRO-OPTO-MECHANICAL MICRO GYROSCOPE

(71) Applicants: Michael Mazilu, St. Andrews (GB); Joanna Ptasinski, San Diego, CA (US); Alexandru Hening, San Diego, CA (US)

(72) Inventors: Michael Mazilu, St. Andrews (GB); Joanna Ptasinski, San Diego, CA (US); Alexandru Hening, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/427,579

(22) Filed: May 31, 2019

(51) Int. Cl.
*G01C 19/5726* (2012.01)
*G01C 19/5677* (2012.01)
*G01C 19/5712* (2012.01)
*G01C 19/5656* (2012.01)
*G01C 19/04* (2006.01)
*H04B 10/40* (2013.01)

(52) U.S. Cl.
CPC ......... *G01C 19/5726* (2013.01); *G01C 19/04* (2013.01); *G01C 19/5656* (2013.01); *G01C 19/5677* (2013.01); *G01C 19/5712* (2013.01); *H04B 10/40* (2013.01)

(58) Field of Classification Search
CPC ............... G01C 19/5726; G01C 19/04; G01C 19/5656; G01C 19/5677; G01C 19/5712; G01C 19/06; G01C 19/42; G01C 19/12; G01C 19/14
See application file for complete search history.

(56) References Cited

U.S. PATENT DOCUMENTS

| 4,997,521 A * | 3/1991 | Howe .................... H02N 1/004 216/17 |
| 6,546,798 B1 | 4/2003 | Waters et al. |
| 6,615,681 B1 * | 9/2003 | Jenkins .................. G01C 19/06 74/5 F |

(Continued)

FOREIGN PATENT DOCUMENTS

CN          104034322       *   9/2014

OTHER PUBLICATIONS

English Translation of CN104034322.*

(Continued)

*Primary Examiner* — Helen C Kwok
(74) *Attorney, Agent, or Firm* — Naval Information Warfare Center, Pacific; Kyle Eppele; Susanna J. Torke

(57) ABSTRACT

A gyroscope and method for navigating using the gyroscope can include a substrate that can define a cavity. The cavity can be placed under a vacuum, and a birefringent microrotor can be located in the cavity. A light source can direct light through the substrate and into the cavity to establish an optical spring effect, which act on the microrotor to establish an initial reference position, as well as to establish rotational and translational motion of said microrotor. A receiver can detect light that has passed through said cavity. Changes in light patterns that can be detected at the receiver can be indicative of a change in position of the microrotor. The change and rate of change in position of the microrotor can be used for inertial navigation.

17 Claims, 3 Drawing Sheets

(56) References Cited

U.S. PATENT DOCUMENTS

| | | | |
|---|---|---|---|
| 6,638,895 B1* | 10/2003 | Karapetrov | C04B 41/5353 |
| | | | 204/157.44 |
| 2015/0000402 A1* | 1/2015 | Russo | G01H 9/00 |
| | | | 73/504.12 |

OTHER PUBLICATIONS

Reich, E. S., "G-Whizzes Disagree Over Gravity", Nature News (2010), doi:doi:10.1038/4661030a.

Acernese, F. et al., "The Virgo 3 KM Interferometer for Gravitational Wave Detection", J. Opt. A 10, 064009 (2008).

Kleckner, D. & Bouwmeester, D., "Sub-Kelvin Optical Cooling of a Micromechanical Resonator", Nature 444, 75-78 (2006).

Kippenberg, T. J. & Vahala, K. J., "Cavity Optomechanics: Back-Action at the Mesoscale", Science 321, 1172-1176 (2008).

Cohadon, P., Heidmann, A. & Pinard, M., "Cooling of a Mirror by Radiation Pressure", Phys. Rev. Lett. 83, 3174-3177 (1999).

Mancini, S., Vitali, D. & Tombesi, P., "Optomechanical Cooling of a Macroscopic Oscillator by Homodyne Feedback", Phys. Rev. Lett. 80, 688-691 (1998).

Mancini, S., Giovannetti, V., Vitali, D. & Tombesi, P., "Entangling Macroscopic Oscillators Exploiting Radiation Pressure". Phys. Rev. Lett. 88, 120401 (2002).

Ashkin, A., Dziedzic, J. M. & Yamane, T. "Optical Trapping and Manipulation of Single Cells Using Infrared Laser Beams", Nature 330, 769-771 (1987).

Neuman, K. C. & Block, S. M., "Optical Trapping", Rev. Sci. Instr. 75, 2787-2809 (2004).

Molina-Terriza, G., Torres, J. & Tomer, L., "Management of the Angular Momentum of Light: Preparation of Photons in Multidimensional Vector States of Angular Momentum", Phys. Rev. Lett. 88, 013601 (2001).

Franke-Arnold, S., Allen, L. & Padgett, M. J., "Advances in Optical Angular Momentum", Laser & Photon, Rev. 2, 299 (2008).

Arita, Y., Mazilu, M. & Dholakia, K., "Laser-Induced Rotation and Cooling of a Trapped Microgyroscope in Vacuum", Nat Comms 4, 2374 (2013).

Esashi, M., Ono, T., "Application Oriented Micro-Nano Electro Mechanical Systems" (Conference Paper), Microprocesses and Nanotechnology 2007; 20th International Microprocesses and Nanotechnology Conference, MNC 2007, Article No. 4456313, pp. 480-481 (2007).

* cited by examiner

ELECTRO-OPTO-MECHANICAL MICRO GYROSCOPE

FEDERALLY-SPONSORED RESEARCH AND DEVELOPMENT

The United States Government and the University Court of the University of St. Andrews (Scotland) have joint ownership rights in this invention, pursuant to joint development of a Subject Invention under Department of the Navy Cooperative and Research and Development Agreement (CRADA) No. NSCRADA-SSCPacific-17-291, entitled "Structured Light for Quantum Optics and Detection". Licensing and technical inquiries may be directed to the Office of Research and Technical Applications, Naval Information Warfare Center, Pacific, Code 72120, San Diego, Calif., 92152; voice (619) 553-5118; ssc_pac_t2@navy.mil, Reference Navy Case Number 108936.

FIELD OF THE INVENTION

This invention pertains generally to gyroscopes. More specifically, the invention pertains to microgyroscopes. The invention is particularly, but not exclusively, useful as a microgyroscope which can incorporate optical spring principles to yield a microgyroscope which can be extremely resistant to shock and vibration, for improved functioning as inertial navigation device in a global positioning satellite (GPS)-denied environment.

BACKGROUND OF THE INVENTION

Light as a measuring tool can deliver incredible precision and versatility. Its main advantages are its constant speed, its clearly defined wavelength and the negligible influence of the light on the measurement itself. The measurement of mechanical displacements can often rely on the interaction between an optical beam and a moving object. Classically, this can be achieved through the use of a Fabry-Perot interferometer (see Prior Art FIG. 1), where the change in the cavity length (dx in Prior Art FIG. 1) can be detected via the optical output of the interferometer. At the macroscopic scale, these high precision measurements can enable the determination of the gravitational constant and the detection of gravitational waves. At the microscopic scale, measuring the optical response of atomic force microscope cantilevers can deliver incredible precision in positional measurements.

It is within this microscopic domain that, in recent years, a new interaction regime has been achieved. Light is no longer a passive measuring technique but gives rise to a non-negligible action on the mechanical system, creating, via its radiation pressure, a back-action. It is this optical feedback that can give rise to the promising field of cavity opto-mechanics. These novel systems can promise to deliver new understanding in fundamental sciences by creating mesoscopic quantum states in systems where the optical and mechanical degrees of freedom can be coupled. The possibilities suggested by the opto-mechanical coupling can range from experimentally demonstrated optical cooling of cavity mirrors in the prior art, to predicted macroscopic entanglement in cavity quantum opto-mechanics, to name a few.

Through the transfer of momentum, laser light can exert observable forces on mesoscopic objects resulting in the well-known field of optical micromanipulation. This technique can be central to current, major advances in the light-matter interaction studies. It can also be directly applicable to molecular biology, colloidal science and nanotechnology amongst other disciplines. Single optical traps can easily be achieved through the focusing of Gaussian profile laser beams by high numerical aperture (NA) objectives (as used herein numerical aperture can be thought of as a measure of the ability to focus the laser beam and resolve details at a fixed object distance. More advanced micromanipulation can be realized through the use of more novel beams. For example, by embedding a singular point—a vortex—in a light field, new dimensions in quantum information processing can be realized. This can allow access to multidimensional Hilbert space, understanding of optical angular momentum and a variety of applications such as in the fields of optical manipulation (e.g. improved axial confinement, rotation of particles, pumping in microfluidic environments and droplet chemistry).

Combining the established approach taken by the cavity opto-mechanical community with advanced optical micromanipulation can create an exciting platform to test quantum mechanics and optical interaction at the mesoscopic scale. Indeed, this novel configuration can integrate the high sensitivity of cavity opto-mechanics with the frictionless properties of optical trapping (in vacuum) to create opto-mechanical cavities where, crucially, the mechanical spring can be replaced by an optical spring. Additionally, because an optical spring can be used in conjunction with a microparticle, which has been set in motion to achieve a gyroscopic effect, extremely small systems can be developed for use as gyroscopes. The systems can be so small (at a mesoscopic scale) that the resulting microscope would be extremely tolerant to shock and vibration errors, which can be inherent in prior art gyroscopic systems.

In view of the above, it can be an object of the present invention to provide an electro-opto-mechanical micro gyroscope that can perform inertial navigation effectively in a GPS-denied environment. Still another object of the present invention can be to provide an electro-opto-mechanical micro gyroscope that can accomplish dead reckoning at a mesoscopic level, to effectively remove the gyroscope error that can be due to shock/vibration sensitivity. Yet another object of the present invention can be to provide an electro-opto-mechanical gyroscope that can incorporate an opto-mechanical cavity where a mechanical spring can be replaced with an optical spring. Still another object of the present invention can be to provide an electro-opto-mechanical micro gyroscope wherein optical and mechanical degrees of freedom can be combined to yield an extremely small, yet incredibly precise, gyroscope. Another object of the present invention can be to provide an electro-opto-mechanical micro gyroscope that can be manufactured and used for inertial navigation in a relatively efficient, cost-effective manner.

SUMMARY OF THE INVENTION

A gyroscope and method for navigating using the gyroscope can include a substrate that can define a cavity. The cavity can be placed under a vacuum, and a birefringent mesoscopic microrotor can be located in the cavity. A light source can direct light through the substrate and into the cavity to establish an optical spring effect, which can act on the microrotor to establish an initial reference position, as well as to establish a microrotor rotational motion and a microrotor translational motion. A receiver can detect light that has passed through said cavity. Changes in light patterns that can be detected at the receiver can be indicative of a change in position of the microrotor. The change and rate of change in position of the microrotor can be used for inertial navigation purposes.

The cavity can have a diameter of thirty micrometers or less (d≤30 μm), for example, while the microrotor can have a diameter of ten micrometers or less (d≤10 μm), and can be made of a vaterite material. The substrate can be made of a material selected from the group consisting of silicon dioxide ($SiO_2$), polydimethylsiloxane (PDMS) or SU8 2000 epoxy resin. Other materials could be used, provided the material allows sufficient light to pass therethrough to establish the optical spring effect. The light source can be a vertical cavity surface emitting laser (VCSEL) emitting in the continuous wave (CW) or the ultrashort-pulsed laser (USPL) regime. Other regimes could be used, or alternatively multiple lasers could be used to establish the optical spring effect on the microrotor. The profile of the laser/plurality of lasers could also be modified so that the laser amplitude (laser intensity) can vary in time, alternatively the laser pulse pattern can vary temporally, i.e., the laser pulse frequency can be varied to establish the optical spring effect. The receiver can be a quadrant photodiode detector (QPD) for detecting the changes in light patterns.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF EMBODIMENTS

Figure 1:
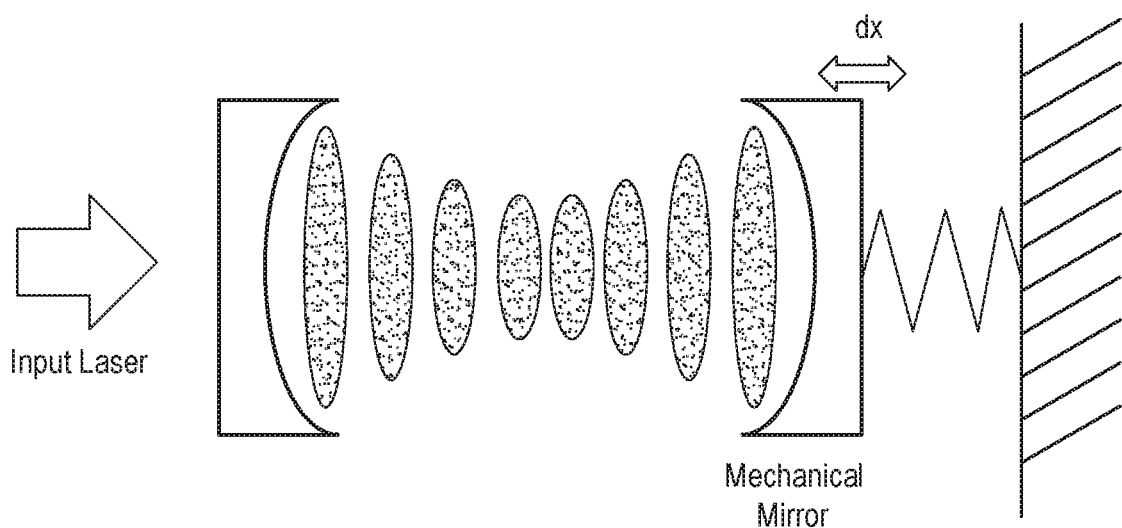
FIG. 1 can be a prior art depiction of light backpressure effect.
Figure 2:
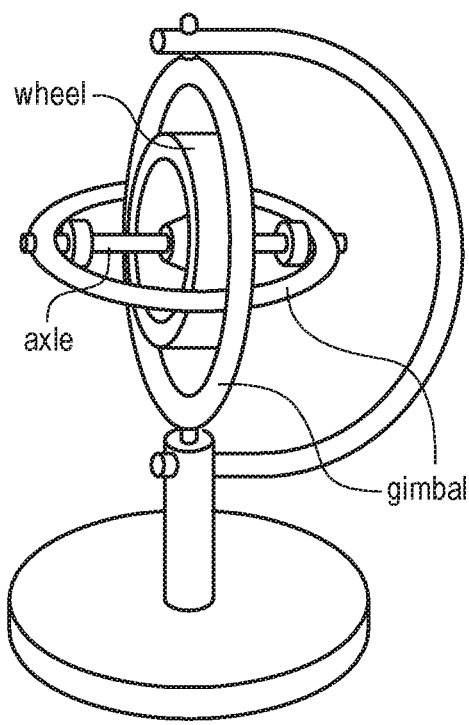
FIG. 2 can be a prior art illustration of a mechanical gyroscope.

In brief overview, a gyroscope can traditionally be thought of as a device that can contain a rapidly spinning wheel. Gyroscopes can be used in compasses, as well as in automatic piloting and inertial guidance (also known as dead reckoning) systems. Gyroscopes in the prior art can tend to be bulky, expensive and difficult to integrate into small vehicles, such as unmanned aerial vehicles (UAV's), for example. Prior Art FIG. 2 is one example of such a mechanical gyroscope configuration.

On the other hand, there are small gyroscopes in the prior art that can use micro-electro-mechanical (MEMS) component devices. Unfortunately, these devices can often lack accuracy; also, these devices can frequency need re-calibration, often at great expense and inconvenience to the end user. The main usage for MEMS gyroscopes can be in the automotive industry and low cost consumer products. The systems and methods of the prevent invention can include the use of novel laser beam profiles to trap and manipulate mesoscopic objects (in particular spherical micro-particles) and to generate gyroscope-like ultrafast rotating action in the micro-particle. Through the transfer of momentum, laser light can exert observable forces on mesoscopic objects (e.g. microsphere), which can be accelerated to very high rotating speeds ($10^6$ rpm).

Figure 3:
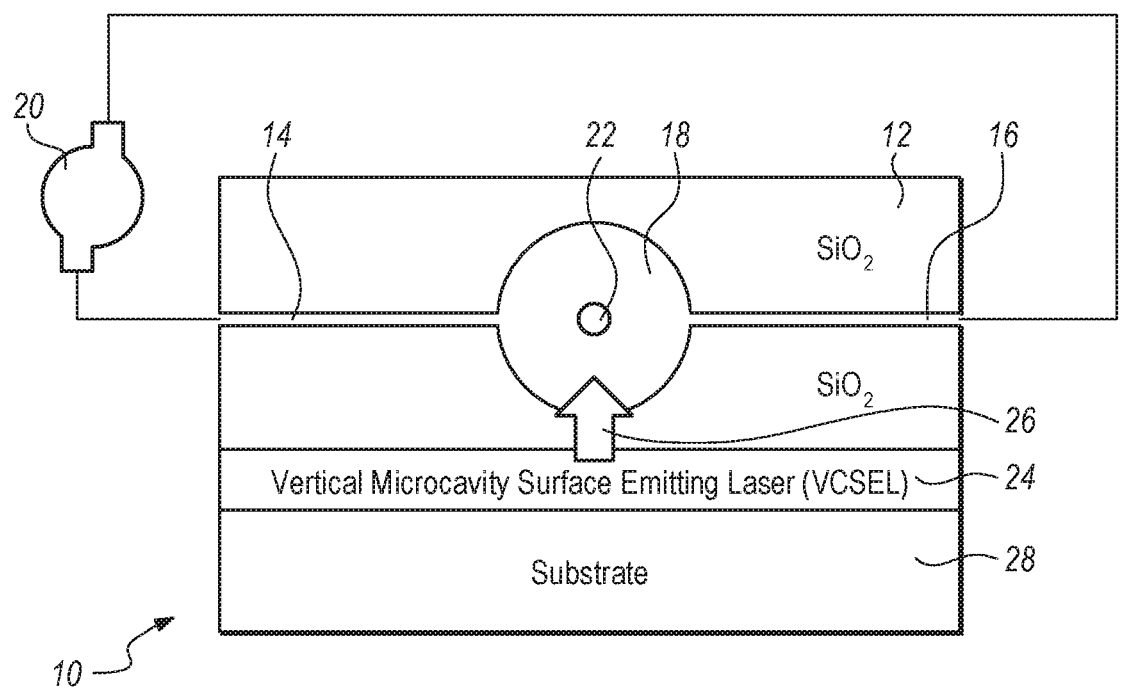
FIG. 3 can be a diagram of an electro-opto-mechanical microgyroscope of the present invention according to several embodiments.

Referring now to FIG. 3, a microgyroscope in accordance with several embodiments of the present invention can be shown, and can be designated using reference character 10. As shown, microgyroscope 10 can include a substrate 12 that can be formed with an inlet 14 and an outlet 16, which can be in fluid communication with a spherical cavity 18 that can be formed in the substrate 16. A vacuum pump 20 can be connected to inlet 14 and outlet 16 to establish a vacuum in cavity 18. For clarity, only one inlet 14, outlet 16 and vacuum pump 20 in shown. It should be appreciated, however that additional inlets 14/outlet 16 can be routed in fluid communication with vacuum pump 20 (or even multiple vacuum pumps 20) and cavity 18, according to design considerations as defined by the end user.

As shown in FIG. 3, the microgyroscope 10 can include a microrotor 22, which can be located within cavity 18. Some of the invention embodiments can be based on the implementation of the optical levitation (using optical spring principles) of microrotor 22 at an initial reference position, within cavity 18, and so that microrotor 22 can have an initial rotational and translational speed. Since cavity is spherical, the initial reference position will be in the center of cavity 18 and any translation motion will be in a direction along the axis of the beam path of light beam 26. To levitate microrotor 22 and thereby establish the optical spring effect on microrotor 22, a light source 24 can be mounted on a mounting substrate 28, as shown in FIG. 3. Light source 24 can emit light 26 into the cavity 18 (via substrate 12, which can be of a material which will allow the light 26 to pass through the cavity, in order to trap the microrotor 22 and thereby establish the reference position on microrotor 22 using the optical spring.

For some embodiments, micro-cavity 18 can be engineered such that a single light beam can trap the microrotor in the center of the cavity. To do this, cavity 18 can be spherical in shape can be up to thirty micrometers (d≤30 μm) in diameter. Other geometries for cavity 18 are possible, provided the geometry allows for the optical spring effect to be established on microrotor 22. Microrotor 22 can typically be spherical and can have a diameter of up to ten micrometers (d≤10 μm). One possible implementation of the microrotor 22 can be a birefringent vaterite particle, which can be rotated via means of angular momentum transfer from the light field. Other materials are certainly possible. For vaterite particles of this size, weight is typically not an issue, and the weight of a vaterite microrotor can be on the order of up to three femtograms. Nevertheless, if the weight of the particle is problematic, the aforementioned trapping of microrotor 22 can be assisted using electrostatic fields (not shown in the Figures).

Once the microrotor has been placed in motion and is up to an initial rotational speed, an initial translation speed and is located at an initial reference position, and subsequent changes in position of the microrotor (from the initial reference position) can be indicative in a change on position (course and speed) of the platform the microgyroscope 10 can be mounted on, and can thus be used for inertial navigation purposes. To do this, the microgyroscope and methods for use therefor can include a receiver 30.

Once a structure and cooperation of structure cited above establishes the motion described above, the initial reference position, initial rotational speed and initial translational speed, changes in these parameters can be indicative of changes in inertia of platform that the microgyroscope 10 is deployed on. Stated differently, changes in these parameters can be used for inertial navigation. To sense changes in position of the microrotor 22 from the reference position, and referring now to FIGS. 4-5, the systems and methods according to several embodiments can include a receiver 30. Receiver 30 can detect light 26 form light source 24 that has passed through substrate 12 and cavity 18. Because microrotor 22 can be of a birefringent material, the light that can be received at receiver 30 can have an initial reference pattern. Additional polarizers can be added to the detectors to measure the rotational degrees of freedom of the microrotor.

As the platform accelerates/decelerates, the microgyroscope 10 can also accelerate/decelerate. As this occurs, the microrotor will briefly move to a different position for the reference position (the geometric center of cavity 18). As this occurs, the resulting light pattern detected at receiver 30 can change. The amount and rate of change (of the light pattern) can be proportional to the degree of acceleration/deceleration being detected by the microgyroscope 10. Thus, the change in light patterns can be indicative of changes in inertia of the body, i.e., for inertial navigation purposes.

Figure 4:
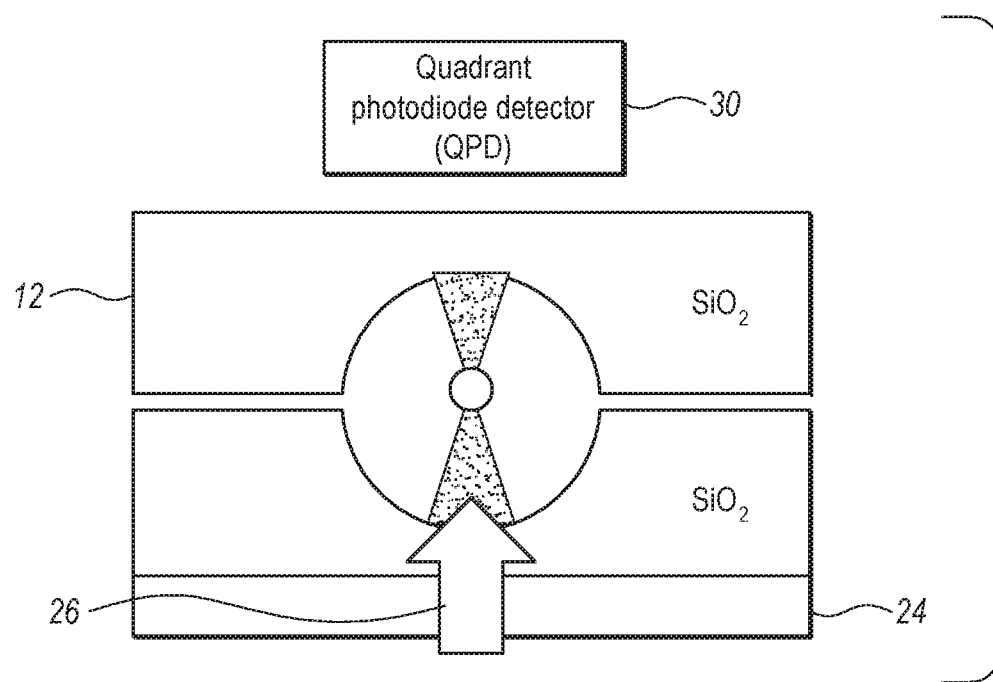
FIG. 4 can be the same diagram as FIG. 3, but with the vacuum pump removed for clarity and with a receiver illustrated.
Figure 5:
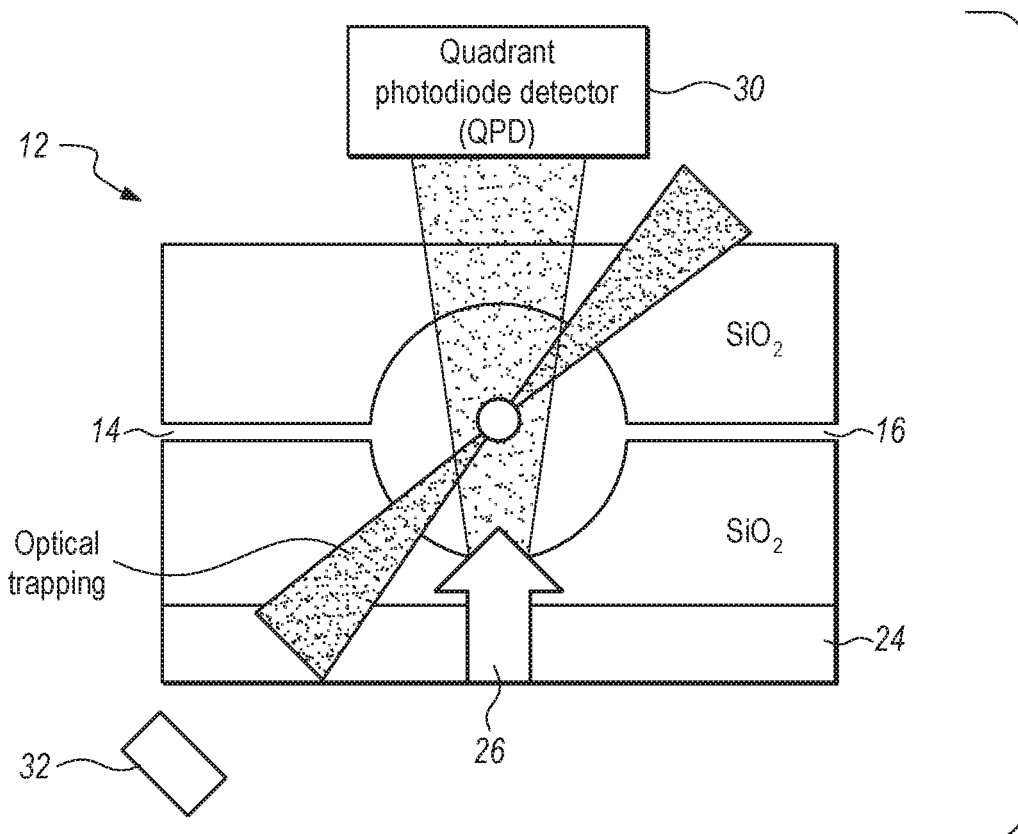
FIG. 5 can be the same illustration of FIG. 4, but of an alternative embodiment of the gyroscope of FIG. 4; and, FIG. 6 can be a block diagram, which can depict steps that can be taken to accomplish some of the methods of the present invention according to several embodiments.

As shown in FIGS. 4-5, receiver 30 can be a quadrant photo diode (QPD). Changes in the light pattern can be detected by receiving changes in light intensity at different quadrants in the QPD. Alternatively, multiple receivers could be used to detect the change in light patterns in light 26. The changes in light profile can be based on the number of light sources 24 that can be used, as well as the actual light profile, i.e., laser profile parameters such as laser pulse width, pulse frequency and laser amplitude (intensity) could be varied at light 24 according to a predetermined algorithm. Changes in those parameters could be what can be detected at receiver 30. Or, multiple light sources 24 could be incorporated to establish the optical spring effect, and the light sources 24 can have different laser profiles. The multiple profiles for light 26 can be received at the same receiver 30, or at multiple receivers 30. Thus, many, many different light source 24 and receiver 30 arrangements could be used, provided light 26 establishes an optical spring effect on microrotor 22, and a resulting initial reference pattern on receiver(s) 30. The initial reference pattern can occur at least partially due to the birefringent property of microrotor causing the light 26 to split, pass through substrate 12, as be detected at receiver as the initial reference pattern. The birefringence of microrotor 22 is also what can cause the microrotor 22 to rotate when light 26 can impinge on microrotor 22 to cause the aforementioned optical spring effect (and of course, the rotation can be what allows device 10 to function as a gyroscope).

As shown in FIG. 4, receiver 30 is a QPD, and light source 24 can be a vertical cavity surface emitting laser (VCSEL). The QPD detector (receiver 30) can serve to capture scattered light from the cavity 18. The VCSEL (light source 24) can serve to both trap the microrotor 22, and can also cooperate with receiver 30 and substrate 12 to monitor the rotation and position of the microrotor 22(VCSEL+QPD). FIG. 5 can illustrate an alternative embodiment of the present invention. In FIG. 5, a separate trapping light source 32 can be included to trap the particle and provide the optical spring effect. VCSEL 24 and QPD can separately monitor the initial reference position (and changes and rate of changes in position from the reference position) of microrotor 22.

Figure 6:
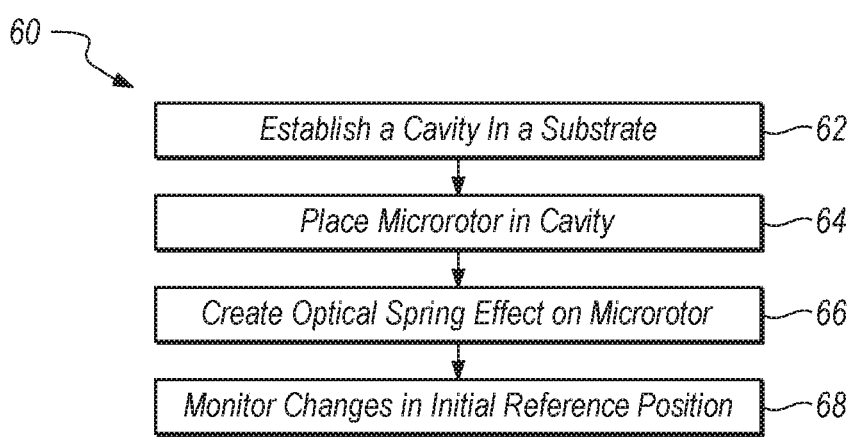

Referring now to FIG. 6, a block diagram can be shown, which can be used to illustrate the methods of the present invention according to several embodiments. As shown, method 60 can include the initial step 62 of establishing a microcavity 18 in a substrate 12, and placing a microrotor 22 in the cavity 18. Next, the methods can include establishing an optical spring effect on microrotor 22 (step 66), to place microrotor 22 in motion and place microrotor 22 at an initial reference position within cavity 18 (for spherical cavities 18, the geometric center of cavity 18 can be the initial reference position). The methods 60 can also include the step 68 of monitoring the changes the position of microrotor 22 from the initial reference position. The monitoring step can be accomplished with receiver 30 and light source 24, as described above. In fact, the overall method can be accomplished using the structure and cooperation of structure described above.

The present invention according to several embodiments can providing a backup solution (or even a primary alternative or substitution solution) for spatial and orientation information to be used in Global Positioning Satellite (GPS)-denied/contested environments. Stated differently, the present invention can provide an inertial navigation solution, using "dead reckoning" techniques, which can be particularly useful because it is so small (mesoscopic) that it is not disturbed by external infrastructure. The main challenges of many prior art gyroscope-based devices can relate to factors such as angle random walk (ARW), bias offset error, bias instability, temperature sensitivity and shock/vibration sensitivity. This present invention can essentially obviate the gyroscope shock/vibration sensitivity problem.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gyroscope, comprising:
    a substrate defining a cavity;
    a birefringent microrotor located in said cavity, wherein said microrotor is made of vaterite material;
    a light source for directing light into said cavity to establish an optical spring acting on said microrotor, to establish rotational and translational motion of said microrotor; and,
    a receiver for detecting said light that has passed through said cavity.

2. The gyroscope of claim 1 wherein said substrate is formed with an inlet and an outlet in fluid communication with said cavity, and further comprising a vacuum pump connected to said inlet and said outlet for establishing a vacuum in said cavity.

3. The gyroscope of claim 1, wherein said cavity has a diameter of thirty micrometers (d=30 μm) or less.

4. The gyroscope of claim 1, wherein said microrotor has a diameter of ten micrometers (d=10 μm) or less.

5. The gyroscope of claim 1, wherein said substrate is made of a material selected from the group consisting of silicon dioxide ($SiO_2$), polydimethylsiloxane (PDMS) or SU8 2000 epoxy resin.

6. The gyroscope of claim 1, wherein said light source is a vertical cavity surface emitting laser (VCSEL) emitting in an ultrashort pulsed laser (USPL) regime.

7. The gyroscope of claim 1, wherein said receiver is a quadrant photodiode receiver (QPD).

8. A method for inertial navigation, comprising the steps of:
    A) establishing a cavity in a substrate
    B) placing a birefringent microrotor made of vaterite material in said cavity;
    C) creating an optical spring effect on said microrotor to establish an initial reference position for said microrotor, and to further establish an initial configuration of rotational motion and translational motion for said microrotor; and,
    D) monitoring changes in said initial reference position and said initial configuration.

9. The method of claim 8, wherein said steps C) and D) are accomplished with a same light source.

10. The method of claim 9, wherein said same light source is a vertical cavity surface emitting laser (VCSEL).

11. The method of claim 10, wherein said step D) is accomplished using a quadrant photodetector (QPD).

12. The method of claim 8, wherein said step A) is accomplished so that the cavity has a diameter of less than thirty micrometers (d<30 μm).

13. The method of claim 8, wherein said microrotor is a birefringent material, and further wherein said microrotor has a diameter of less than ten micrometers (d<10 μm).

14. A gyroscope, comprising:
    a birefringent microrotor comprised of vaterite material;
    said microrotor disposed within a microcavity defined by a substrate;
    an optical spring operating on said microrotor to create a backpressure effect on said microrotor, said backpressure effect trapping said microrotor within said microcavity at an initial reference position, and further causing an initial reference rotational motion and reference translational motion on said microrotor; and,
    a means for monitoring changes in said initial reference position, said initial rotational motion and said translational motion.

15. The gyroscope of claim 14, wherein said microcavity has a diameter of thirty micrometers (d=30 μm) or less.

16. The gyroscope of claim 14, wherein said microrotor has a diameter of ten micrometers (d=10 μm) or less.

17. The gyroscope of claim 14, wherein said optical spring further comprises a vertical cavity surface emitting laser (VCSEL) illuminating said substrate and said microrotor.

* * * * *